No. 694,888. Patented Mar. 4, 1902.
A. J. PFLUGER.
UMBRELLA SUPPORT.
(Application filed Aug. 21, 1901.)
(No Model.)
Fig. 1.
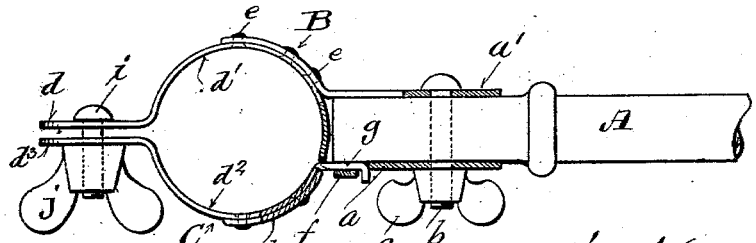
Fig. 2.
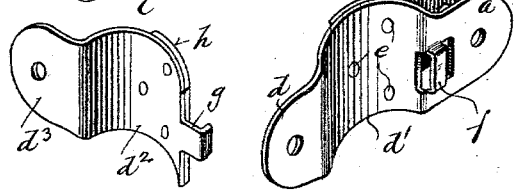
Fig. 3.
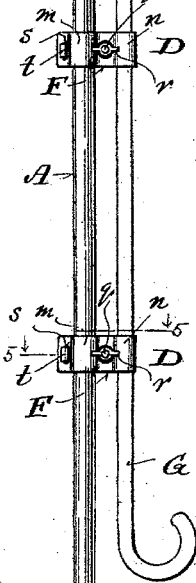
Fig. 4.
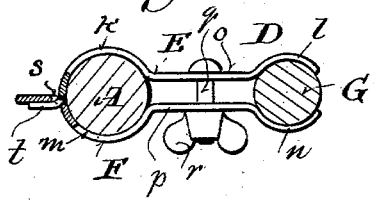
Fig. 5.
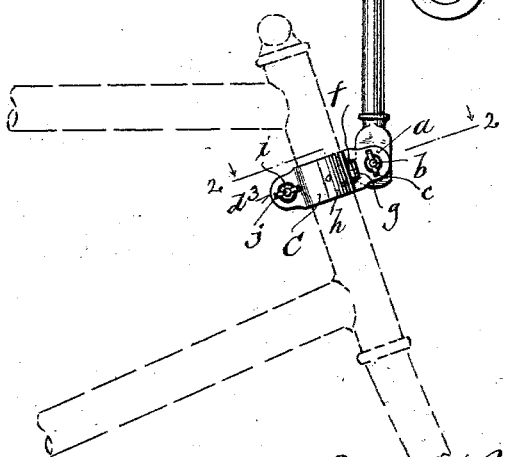
Witnesses:
Geo. W. Young.
E. Romer.
Inventor
Anton John Pfluger,
By Livingston & Thompson
Attorneys

UNITED STATES PATENT OFFICE.

ANTON JOHN PFLUGER, OF BRILLION, WISCONSIN.

UMBRELLA-SUPPORT.

SPECIFICATION forming part of Letters Patent No. 694,888, dated March 4, 1902.

Application filed August 21, 1901. Serial No. 72,738. (No model.)

*To all whom it may concern:*

Be it known that I, ANTON JOHN PFLUGER, a citizen of the United States, and a resident of Brillion, in the county of Calumet and State of Wisconsin, have invented certain new and useful Improvements in Umbrella-Holders for Bicycles; and I do hereby declare that the following is a full, clear, and exact description thereof.

My invention has for its object to provide an umbrella-holder for bicycles which may readily be attached to the frame of a bicycle and is capable of being adjusted at various angles, backward or forward, and also permits of adjusting the height of the umbrella to any position desired by the operator; and it consists in certain peculiarities of construction and combination of parts, to be fully set forth hereinafter, with reference to the accompanying drawings, and subsequently claimed.

In the drawings, Figure 1 is a side elevation of my device, showing it applied to the steering-head of a bicycle (the latter illustrated in dotted lines) and an umbrella of ordinary construction in position. Fig. 2 is an enlarged detail cross-section of the bicycle-frame clip indicated by the line 2 2 of Fig. 1. Figs. 3 and 4 are perspective views of the members of said frame-clip, and Fig. 5 is a cross-section on line 5 5 of Fig. 1 of one of the adjustable umbrella-clamps.

Referring by letters to the drawings, A is a rod, of any suitable material, which is pivoted between two ears $a$ $a'$ of a clip member B by a bolt $b$, said bolt being provided with a thumb-nut $c$, by means of which the rod A is locked at any angle, backward or forward, which may be desired by the rider, the rod being enlarged and flattened where it is pivoted to present as much surface as possible to the ears $a$ $a'$, so that when clamped up by the thumb-nut $c$ it will by the friction of the several parts be prevented from slipping. The clip member B has a flat ear $d$ and then springs out in a semicircle to form a socket $d'$ and is again bent out straight to form the pivot-ear $a$, the other ear $a'$ being riveted at $e$ $e'$ to the socket $d'$. By this construction both ears $a$ and $a'$ are flexible enough so that they may be drawn up tightly against the flattened end of the rod A. At the junction of the ear $a$ with the socket $d'$ a portion of the metal is cut out to form a strap $f$, which is slightly bent outward, thus forming a pocket for the reception of a flat hook $g$, the inner surface of which is flush with the inner surface of the ear $a'$, the hook $g$ being an extension of the other member C of the clip, which has a corresponding socket $d^2$ and flat ear $d^3$ and is also reinforced at $h$ to add strength thereto.

By the above construction it is obvious that the clip can readily be placed either around the steering-head or reach-tube of a bicycle, the clip member B being first placed against the part to be clamped. The hook $g$ of the member C is then inserted into the strap $f$ of member B, and the ears $d$ and $d^3$ are brought together and secured by a bolt $i$ and thumb-nut $j$, thereby firmly clamping tube of the bicycle.

The rod A is provided with a pair of clamps D of similar construction and adjustable upon the former and as best illustrated in Fig. 5 of the drawings. These clamps are made in two parts E F, having corresponding jaws $k$ $l$ and $m$ $n$, respectively, the jaws $k$ $m$ clamping the rod A, while those marked $l$ $n$ of said clamp encircle the handle G of an ordinary umbrella, and between said jaws are flat bridge-pieces $o$ $p$, through which passes a bolt $q$ and thumb-nut $r$, so that by tightening up the latter both umbrella-handle G and rod A are locked simultaneously. The parts E and F of clamps D are held together by means of a slot $s$ in an extension of the part F and a hook extension $t$ in part E, fitting into said slot.

By the above construction it will be seen that the clamps D will hold the handle G of the umbrella at any elevation desired rigid with the rod A, together with the adjustment of the angle of the latter, it is possible for the rider of a bicycle to protect himself with an umbrella as effectively as if held by him without in any way inconveniencing his freedom.

Having thus described my invention, what I claim as new, and desire to secure by Letters Patent, is—

1. In an umbrella-holder for bicycles, a clip composed of two members secured to the frame thereof, ears projecting from one of said members, a rod pivoted between the latter and adapted to be adjusted at various angles upon its pivot, a hook $g$ projecting from the other member of clip and a pocket in the first member for the reception of the hook and a clamping-bolt for securing the members to the frame of the bicycle, whereby when said bolt locks the two members upon the frame the hook $g$ is simultaneously pressed against the pivoted rod and locks the same in its adjusted position substantially as set forth.

2. In an umbrella-holder for bicycles, a clip composed of two members secured to the frame thereof, ears projecting from one of said members, a rod pivoted between said ears, a thumb-nut upon one end of said pivot whereby the rod is held at various adjusted positions upon the former, a hook projecting from the other member of said clip, and a pocket in the first member for the reception of said hook; a thumb-nut and bolt at the opposite end of said members, whereby the latter are secured to the frame of the bicycle; adjustable clamps upon the aforesaid rod; an umbrella-handle fitted in said clamps, and means for locking the latter upon the rod and umbrella-handle, substantially as set forth.

In testimony that I claim the foregoing I have hereunto set my hand, at Brillion, in the county of Calumet and State of Wisconsin, in the presence of two witnesses.

ANTON JOHN PFLUGER.

Witnesses:
S. H. BARNARD,
MICHAEL MILLER.